United States Patent
Sul et al.

(10) Patent No.: US 9,915,828 B2
(45) Date of Patent: Mar. 13, 2018

(54) LENS DRIVING DEVICE

(71) Applicants: HyunHee Sul, Shenzhen (CN); DeaYue Yang, Shenzhen (CN); YoungJin Kim, Shenzhen (CN)

(72) Inventors: HyunHee Sul, Shenzhen (CN); DeaYue Yang, Shenzhen (CN); YoungJin Kim, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 199 days.

(21) Appl. No.: 14/984,304

(22) Filed: Dec. 30, 2015

(65) Prior Publication Data

US 2016/0238856 A1    Aug. 18, 2016

(30) Foreign Application Priority Data

Feb. 12, 2015  (CN) .......................... 2015 1 0075326

(51) Int. Cl.
G02B 27/64 (2006.01)
G02B 7/08 (2006.01)

(52) U.S. Cl.
CPC ............. *G02B 27/646* (2013.01); *G02B 7/08* (2013.01)

(58) Field of Classification Search
CPC .... G02B 27/646; G02B 15/173; G02B 15/14; G02B 15/177

USPC .................................................. 359/554–557
See application file for complete search history.

(56) References Cited

U.S. PATENT DOCUMENTS

| | | | |
|---|---|---|---|
| 2011/0141564 A1* | 6/2011 | Sata ....................... | G02B 7/102 359/557 |
| 2014/0169777 A1* | 6/2014 | Ishimasa .............. | G02B 27/646 396/55 |
| 2016/0161757 A1* | 6/2016 | Hee ...................... | G02B 27/646 359/557 |

\* cited by examiner

*Primary Examiner* — Bumsuk Won
*Assistant Examiner* — Tamara Y Washington
(74) *Attorney, Agent, or Firm* — Na Xu; IPro, PLLC

(57) ABSTRACT

A lens driving device includes a housing having a base, an upper cover engaged with the base, and a receiving space formed by the base and the upper cover; a permanent magnet mounting base arranged on the base; a permanent magnet fixed on the permanent magnet mounting base; a lens barrel used for holding a lens group therein and movable along a direction parallel to an optic axis of the lens group; a driving coil surrounding an outer surface of the lens barrel, and opposite to the permanent magnet mounted on the permanent magnet mounting base; an anti-shake coil opposite to the permanent magnet mounted on the permanent magnet mounting base; an elastic part suspending and connecting with the lens barrel; an OIS elastic part fixed to an upper surface of the permanent magnet mounting base for restoring the permanent magnet mounting base to a predetermined position.

10 Claims, 8 Drawing Sheets

LENS DRIVING DEVICE

FIELD OF THE INVENTION

The present invention is related to a type of lens module of camera, especially to a lens driving device having optical image stabilizing (OIS) function against the dithering images caused by shaking.

DESCRIPTION OF RELATED ART

Recently, portable terminals similar to smart phones and tablets are equipped with high-performance camera modules in addition to portable camera. High-performance lens module conFig.d in the portable terminal generally has the functions of auto focusing and optical image stabilization. The function of optical image stabilization (OIS) can reduce the image shaking caused by external vibration or the trembling of user's hands. Optical anti-shaking function is divided into the lens shift type by which the lens moves along direction perpendicular to optical axis of camera and image sensor shift type by that the image sensor moves along the direction perpendicular to optional axis of lens. Normally, the portable terminal is equipped with the "lens shift type" lens module with optical image stabilization function.

The lens module with "lens offset type" optical image stabilization function, must have camera quickly returned to the base pivot (i.e., in situ) after photographing. Optical image stabilization lens module of related technologies determines the position and offset volume of the lens hall sensor, and provide suitable current coil to the stabilization (stabilization coil) to have the lens return to normal position. Consequent question is, hall sensor will cause the increase in the cost of lens module, and the camera module structure is complex, hence it is difficult to realize the miniaturization of camera module. In addition, the recovery action of lens in situ is accomplished by control circuit, hence the reset will be delayed, and the reliability is low.

Moreover, for purpose of the realization of automatic focusing (AF) function, optical image stabilization lens module powered with relevant technologies must supply AF (coil) with appropriate current coil to lifting movement of the lens. In order to energize the AF coil outside the lens module, the part like the suspension wire must be provided. However, it is extremely difficult to add suspension wire in the process of cascade and combination of multiple parts, therefore increasing the assembly difficulty of camera module, and the production efficiency is low.

Therefore, it is necessary to provide a new type of lens driving device to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the Fig.s and the embodiment. It should be understood the specific embodiment described hereby is only to explain this disclosure, not intended to limit this disclosure.

Figure 1:
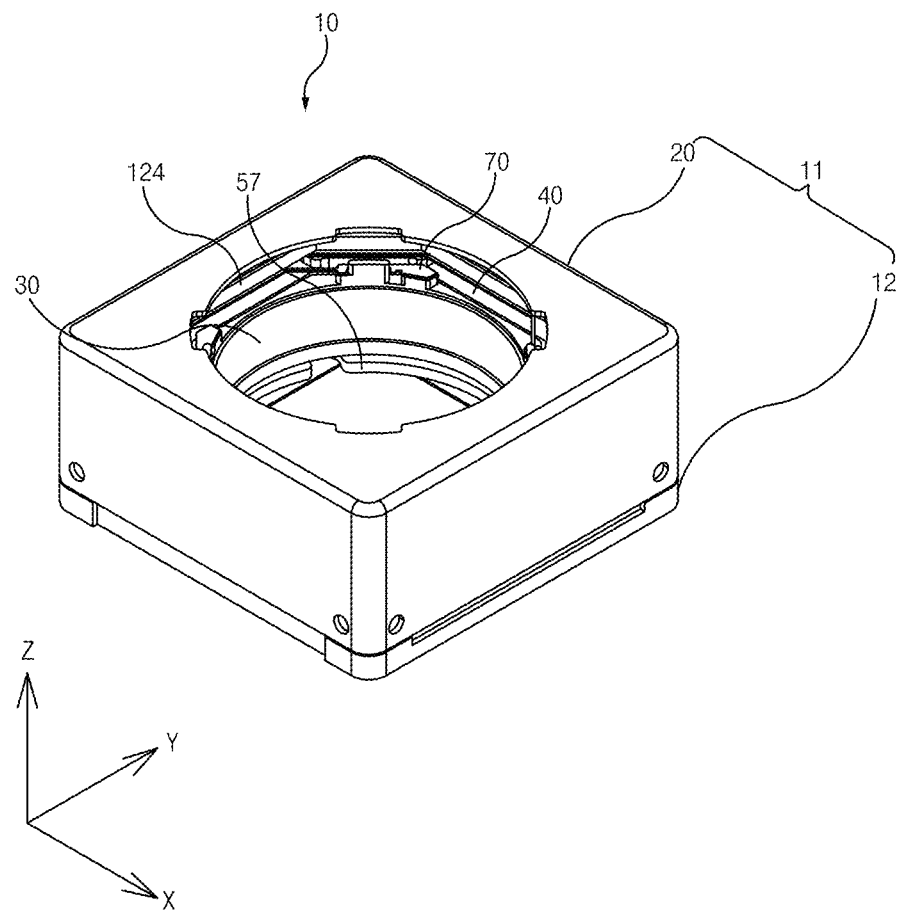
FIG. 1 is an isometric view of a lens driving device in accordance with an exemplary embodiment of the invention.
Figure 2:
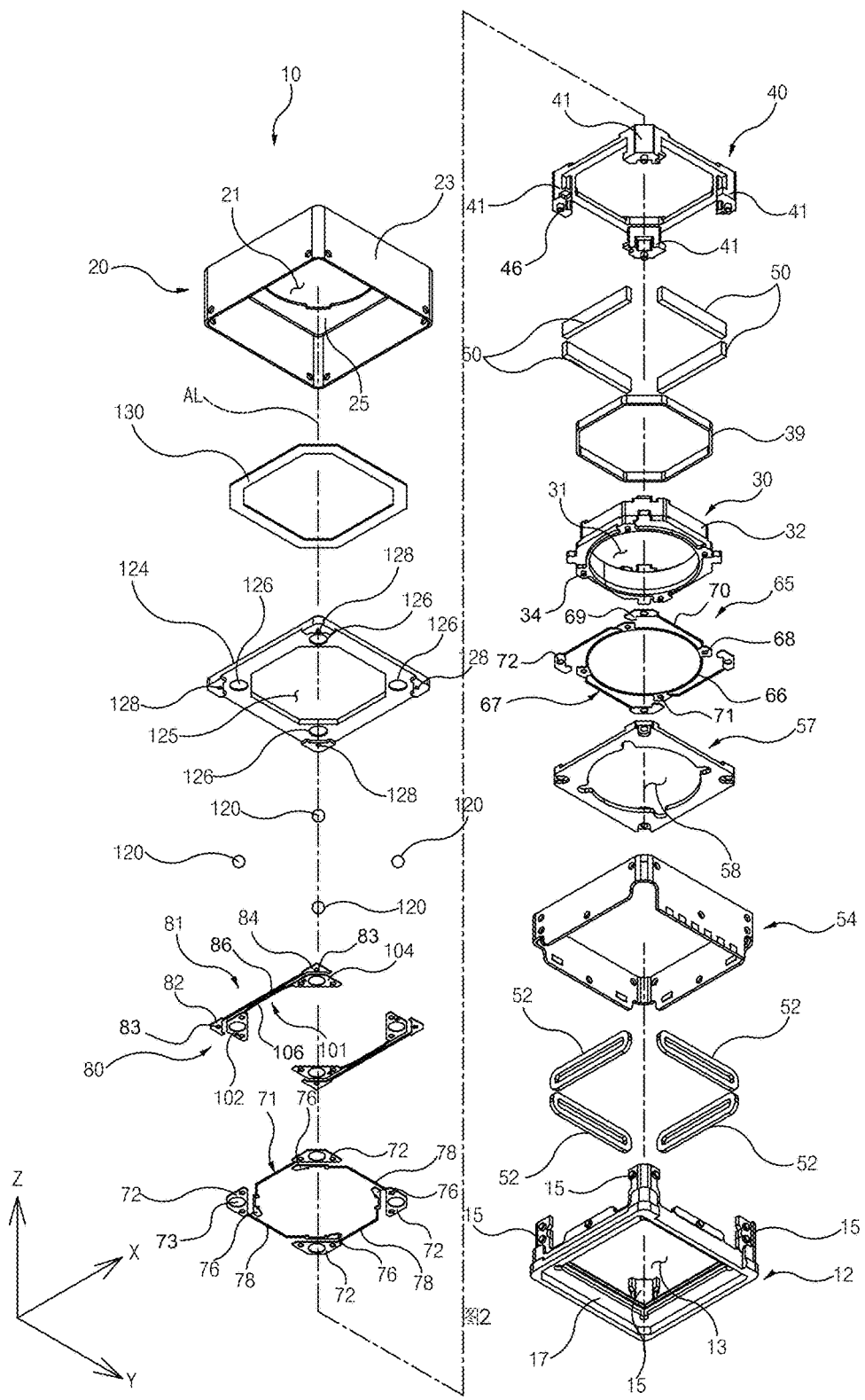
FIG. 2 is an exploded and isometric view of the lens driving device in FIG. 1.
Figure 3:
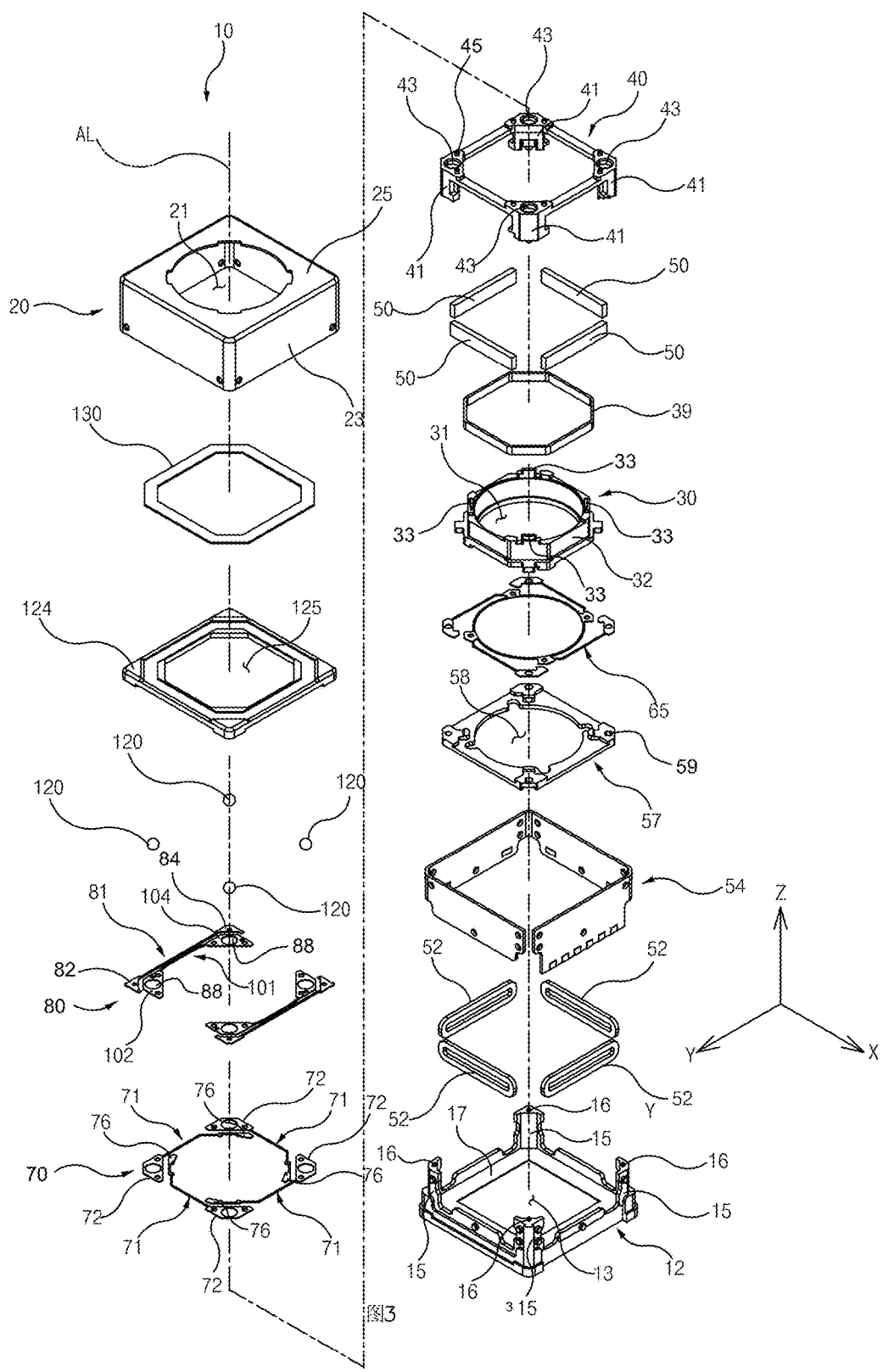
FIG. 3 is similar to FIG. 2, but from another aspect.
Figure 4:
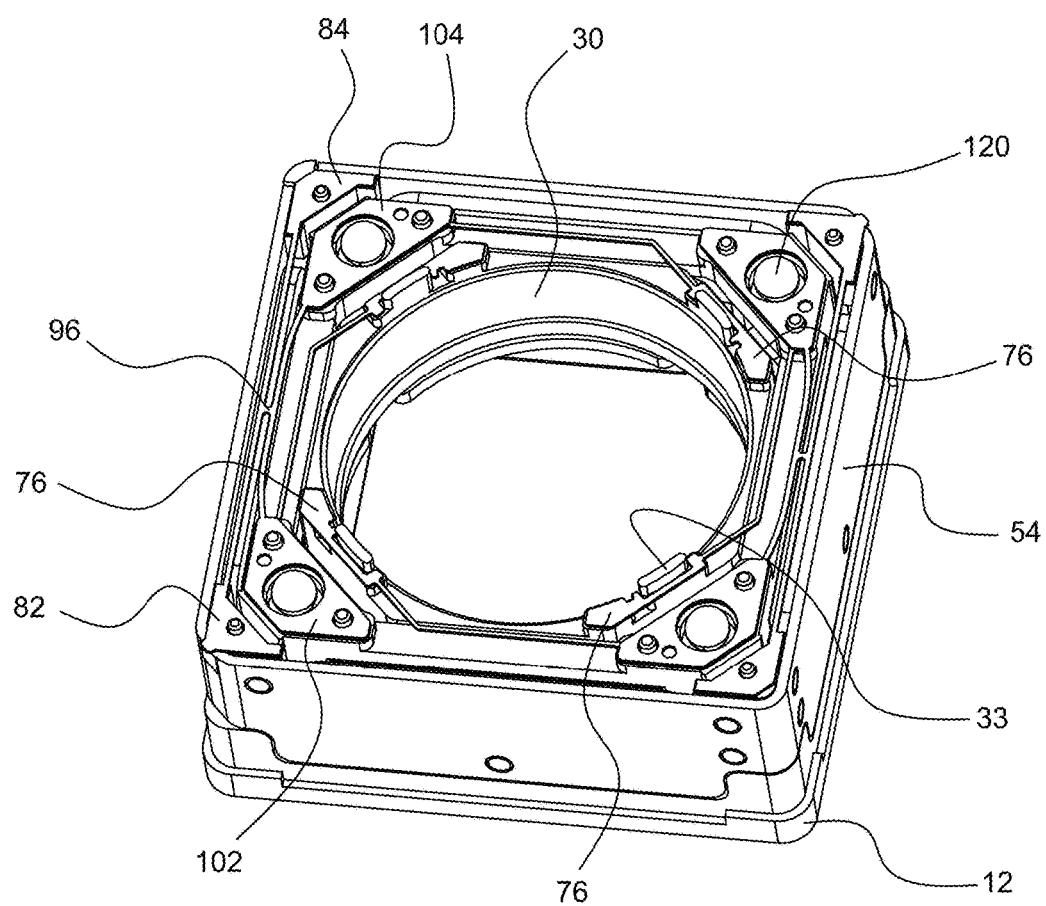
FIG. 4 is an exploded and isometric view of the lens driving device, with an upper cover and a head cover thereof removed.

A lens driving device 10 in accordance with an exemplary embodiment of the invention with AF (auto focusing) and OIS (optical image stabilization) functions can be applied in smart mobile phone and tablet PC etc portable mobile terminals. As shown in FIGS. 1-3, the lens driving device 10 includes a housing 11, a lens barrel 30, a permanent magnet mounting base 40, a permanent magnet 50, a drive coil 39, an anti-shake coil 52, a circuit board 54, a head cover 124, a lower cover 57, a plurality of elastic parts, a plurality of OIS elastic parts 80, and a plurality of bearing balls 120.

The housing 11 has a base 12 and an upper cover 20 engaged with the base 12. The upper cover 20 and the base 12 cooperatively form a receiving space. The base 12 is one rectangular box structure which includes a main body part 17, a second loophole 13 formed by the main body part 17 and a column 15 formed by and extended from four corners of the main body part 17 toward the upper cover 20. Upper end surfaces of the four columns 15 project upwardly and form corresponding joint tongues 16.

The upper cover 20 includes a rectangular upper wall 25 and four side walls 23 bending and extending from the upper wall 25 downwardly. A first loophole 21 is formed in a center of the upper wall 25.

The lens barrel 30 is annual configured and includes a lens receiving hole 31 in a center thereof. A lens group can be received in the lens receiving hole 31 and rise and fall in the receiving space of the housing 11 along a direction of an optical axis namely the direction of Z-axis. The lens barrel 30 has an outside surface 32, a driving coil 39 wound around the outside surface 32 of the lens barrel 30.

The permanent magnet mounting base 40 is one rectangular box body encircling the lens barrel 30 and is movable in the receiving space of the housing 11 along the direction perpendicular to the optical axis, namely along the direction parallel to XY plane. The permanent magnet mounting base 40 includes a plurality of mounting poles 41 located in four corners thereof.

Any two adjacent mounting poles 41 form four mounting positions. Four permanent magnets 50 are mounted in four mounting positions respectively. The permanent magnets 50 are located inside the housing 11 and opposite to an inner surface of the side walls 23 of the upper cover 20. The circuit board 54 is fixed on the inner surface of the side wall 23 of the upper cover 20. Four anti-shake coils 52 are connected to the circuit board 54 electronically and opposite to four permanent magnets 50 respectively.

The lower cover 57 is a rectangular frame with a fourth loophole 58 and mounted between the main body part 17 of the base 12 and the lens barrel 30 for limiting the movement of the lens barrel 30 along the negative direction of Z-axis. The lower cover is located on the main body part 17. There are connecting holes 59 in four corners and there is a connecting column 34 on each corner of the surface of the lens barrel 30 facing the lower cover 57. The connecting column 34 is received in the connecting hole 59.

The lower end of one side of the circuit board 54 extends externally towards the housing 11 and is connected with an external power source (not shown). The OIS elastic parts 80 are made of conductive materials. The OIS elastic parts 80 can be connected with the upper elastic parts 70 electronically. The upper elastic parts 70 can be connected with the driving coil 39 electronically.

The lens barrel 30, the permanent magnet mounting base 40, the upper elastic parts 70 and the OIS elastic parts 80 can be mounted one by one on the lens driving device 10. Power is supplied to the driving coil 39 through the OIS elastic parts 80 and the upper elastic parts 70. The accessories such as suspension wire can be omitted to simplify assembly and improve output.

It is noteworthy that the power supply mode of the anti-shake coil 52 and the drive coil 39 should not be limited to the above-mentioned embodiment. For example, the lower elastic parts 65 is made of conductive materials and can be connected electronically with the drive coil 39 and the circuit board 54, so power is supplied to anti-shake coil 52 through the circuit board 54 from the housing 11 and to the drive coil 39 through the lower elastic parts 65.

The head cover 124 is a rectangular box body with a third loophole 125 in a center and mounted between the inner part of the upper wall 25 of the upper cover 20 and the permanent magnet mounting base 40. Connecting grooves 128 and receiving groove 126 used for receiving steel balls 120 are set in the four corners of the head cover 124 facing the base 12. The joint tongue 16 on the upper end of the four columns 15 of the base 12 are locked connected with four connecting grooves 128.

The elastic parts has the role of limiting lens barrel 30 to exceed the predetermined displacement caused by impact of accident or vibration. The elastic parts include upper elastic parts 70 and lower elastic parts 65. The lens barrel 30 moves along the direction parallel to optical axis. When it exceeds the moving range, the upper elastic parts 70 and the lower elastic parts 65 can provide elastic restoring force to return the lens barrel 30 to the predetermined position. The upper elastic parts 70 are mounted between the OIS elastic parts 80 and the upper end surface of lens barrel 30. The lower elastic parts 65 are mounted between the lower cover 57 and the lower end surface of lens barrel 30.

The upper elastic part 70 includes four head-tail plate springs 71. The four head-tail plate springs 71 forms one rectangle. Each plate spring 71 has a first end part 72 and a second end part 76. The first end part 72 is connected with the upper end surface of the permanent magnet mounting base 40. The second end part 76 is connected with the upper end surface of lens barrel 30. Two end parts are connected through a horizontal beam 78. A through-hole 73 that is used to accept bearing steel ball 102 is set on the first end part 72. Specifically, the permanent magnet mounting base 40 forms a plurality of connecting lugs 45 respectively on four corners of the surface of the upper cover 20 and connecting through-hole 74 is formed on the first end part 72 to fit the connecting lug 45. Connecting through-hole 74 is set on two sides of through-hole 73 respectively. In addition, the connecting lug 45 locked and connected with the second end part 76 is formed on the surface that lens barrel 30 faces to upper cover 20 and the position that corresponds to the second end part 76.

The lower elastic part 65 includes an annular cantilever 66 and an elastic arm 67 symmetrically about the annular cantilever 66. Each elastic arm 67 has a fixed end 68 fixed with the annular cantilever 66, a free end 69 far away from the fixed end 68 and a connecting arm 70 connected with the fixed end 68 and the free end 69. A connecting hole 71 set on the fixed end 68 is connected with the lens barrel 30. The connecting pole 34 locked connected with the connecting hole 71 is set on the lens barrel 30. The through-hole 72 engaged with the permanent magnet mounting base 40 is set on the free end 69. A projecting part 46 locked and engaged with the through-hole 72 is set on the surface of lower end of four columns 41 of the permanent magnet mounting base 40.

The OIS elastic part 80 is mounted between the head cover 124 and the upper elastic parts 70. The OIS elastic parts 80 can move on the XY plane to limit the moving range of the permanent magnet mounting base 40. Besides, once the permanent magnet mounting base 40 breaks away from the established position, the elastic restoring force generated by the OIS elastic parts 80 will return the permanent magnet mounting base 40 back to the established position.

The OIS elastic parts 80 include one pair of plate spring assembly with the exactly same structure. Each plate spring assembly includes a first plate spring 81 and a second plate spring 101 connected with the first plate spring 81. The first plate spring 81 includes a first outer end 82, a second outer end 84 away from the first outer end 82 and a first beam 86 connected with the first outer end 82 and the second outer end 84. The second plate spring 101 includes a third outer end 102, a fourth outer end 104 away from the third outer end 102 and a second beam connecting the third outer end 102 and the fourth outer end 104. The first beam 86 is connected with the second beam 106 in the center through an interconnecting piece 96.

Specifically speaking, the first mounting hole 83 is set up on both the first outer end 82 and the second outer end 84. And the receiving hole 88, which is used to accept the steel ball 120, is formed in the center of the third outer end 102 as well as the center of the fourth outer end 104. The second mounting hole 89 is set up respectively on both sides of the receiving hole 88. And the first mounting holes 83 which is located on the first outer end 82 and the second outer end 84 are engaged with the joint tongue 16 on base 12. The second mounting hole 89 which is located both on the third outer end 102 and the fourth outer end 104 is engaged with the connecting protrusion 45 on permanent magnet mounting base 40.

On the other hand, four bearing steel balls 120 are mounted between permanent magnet mounting base 40 and the head cover 124. As the permanent magnet mounting base 40 moves on the XY plane, the bearing steel ball 120 can play the role of reducing friction. In addition, in order not to make those four bearing steel balls 120 break away from the predetermined position, a ball mounting groove 43 is respectively set up on the four corners of the permanent magnet mounting base 40. The top of bearing steel ball 120 is accepted in the receiving groove 126 of the head cover 128, and it can rotate and move in XY plane. Thus there is no doubt that the inner diameter of the receiving groove 126 is greater than that of the bearing steel ball 120.

Differing from the traditional rail type ball mounting groove, the receiving groove 126 of head cover 128 as well as the ball mounting groove 43 of permanent magnet mounting base 40 both do not extend on the direction of X or Y. Therefore, when the current is introduced on the anti-shake coil 52 and the permanent magnet mounting base 40 moves in XY plane under the action of Lorentz Force, the reset path of the permanent magnet mounting base 40 doesn't exist roundabout, on the contrary, it can arrive at the appointed position rapidly through the shortest path.

In order to realize the function of automatic focusing, the operation modes of lens driving device 10 are described as follows. The current flows through the driving coil 39, and the Lorentz Force is generated between the permanent magnet 50 and the driving coil 39. Moreover, Lorentz Force can make the lens barrel 30 move up and down following the direction of the optical axis in the outer cover 11. When the current is stop, the elastic restoring force of the upper elastic parts 70 as well as the lower elastic parts 65, which lens barrel 30 relies on, is back to the original position.

The lens driving device 10 also includes a gyroscope (not shown). And the lens driving device 10 can induce shaking through the gyroscope. Then there is current flowing through anti-shake coil 52, and the Lorentz Force generated between permanent magnet 50 and anti-shake coil 52 leads the Lens Barrel 30 to move on the plane which is perpendicular to the optical axis and to move towards the position where the ambiguity of the image on imaging sensor (no graphical representation) can be decreased. When the current is stop, the elasticity of the OIS elastic parts 80, which permanent magnet mounting base 40 and Lens Barrel 30 rely on, is back to the original position.

Figure 5:
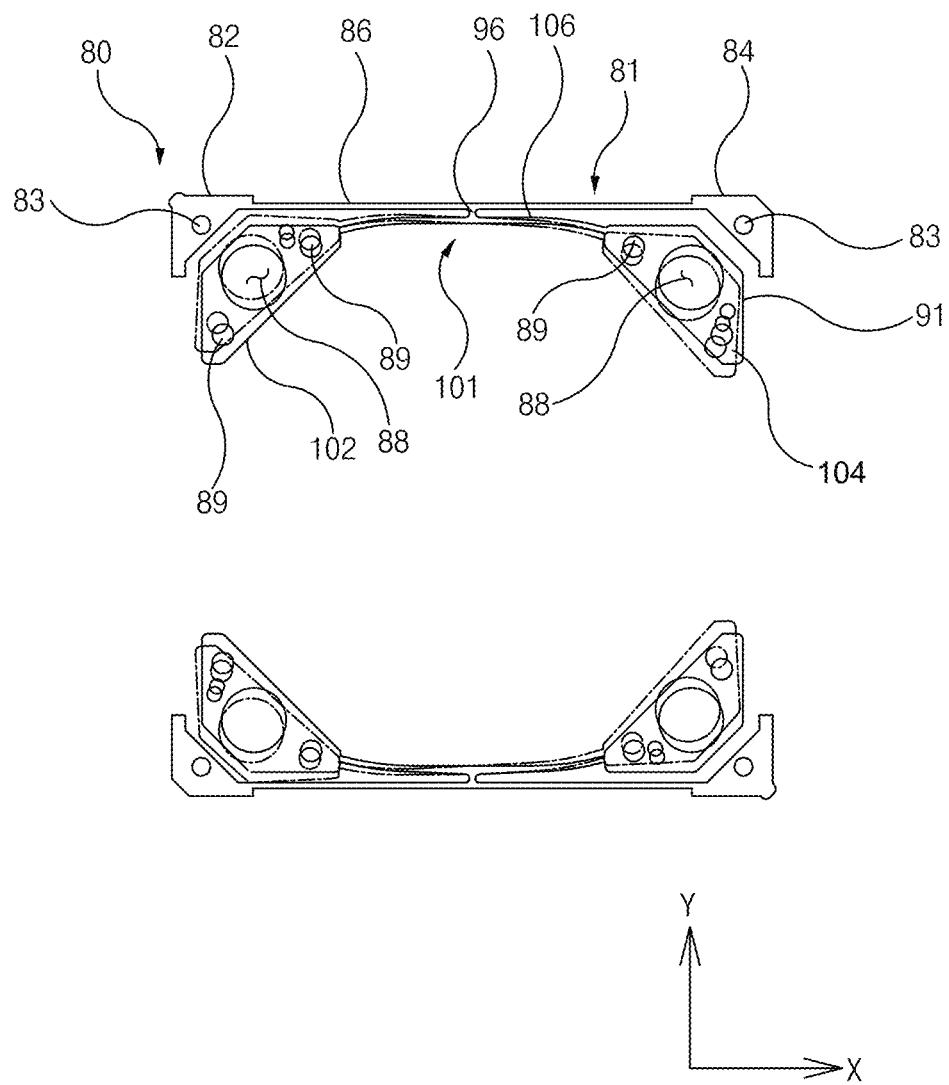
FIG. 5 is an illustrative view showing elastic deformation of OIS elastic parts when a permanent magnet mounting base of the lens driving device moves along a negative direction of X-axis.
Figure 6:
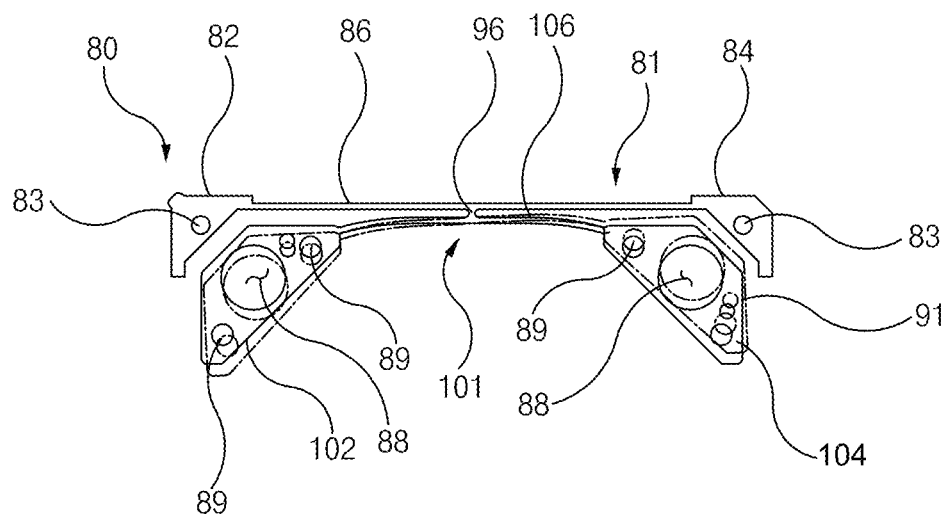
FIG. 6 is an illustrative view showing elastic deformation of the OIS elastic parts when the permanent magnet mounting base of the lens driving device moves along a positive direction of X-axis.
Figure 6:
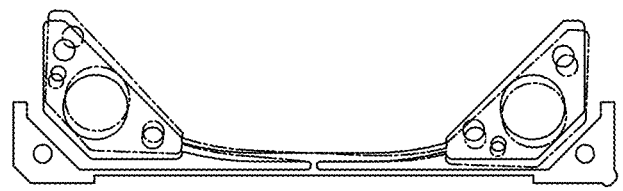
Figure 7:
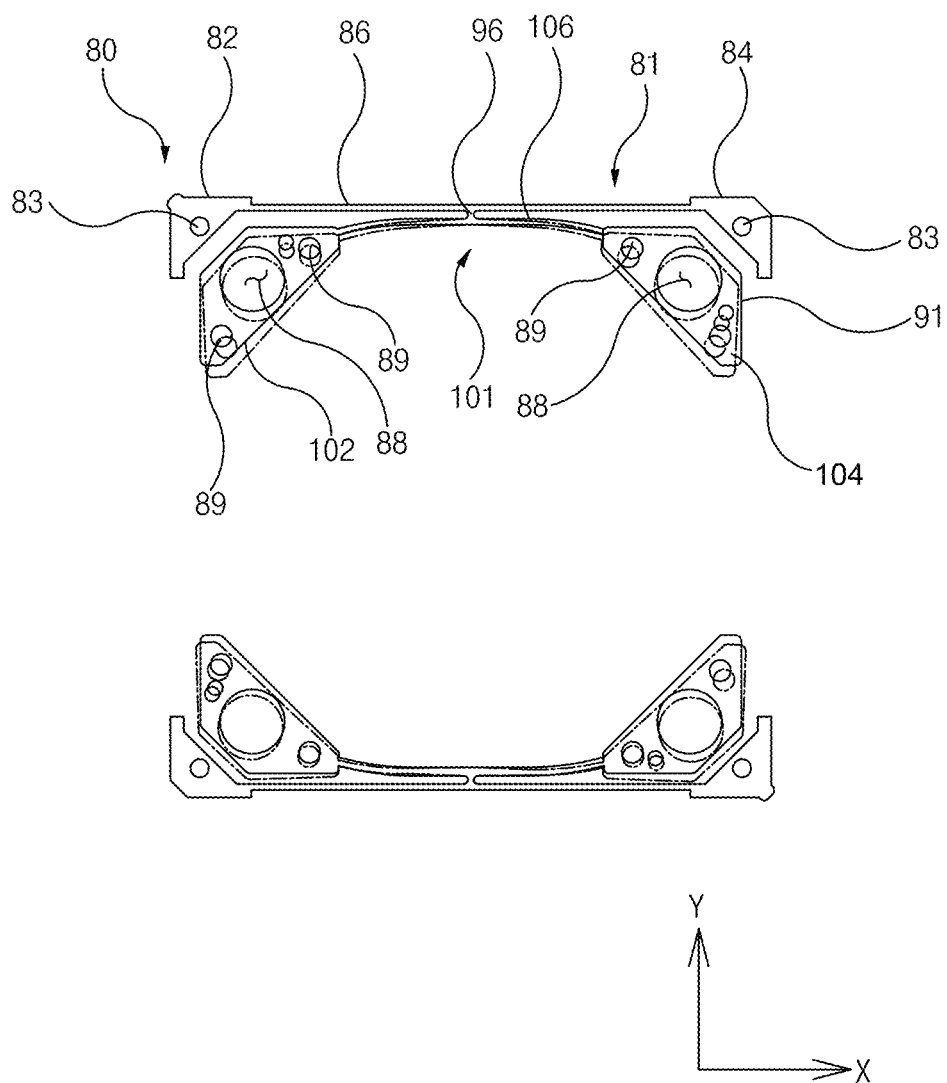
FIG. 7 is an illustrative view showing elastic deformation of the OIS elastic parts when the permanent magnet mounting base of the lens driving device moves along a negative direction of Y-axis.
Figure 8:
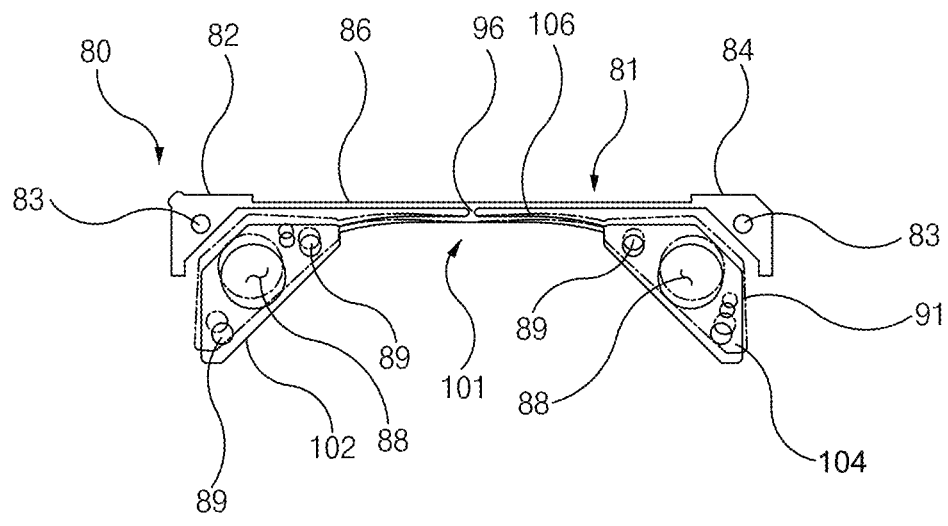
FIG. 8 is an illustrative view showing elastic deformation of the OIS elastic parts when the permanent magnet mounting base of the lens driving device moves along a positive direction of Y-axis.
Figure 8:
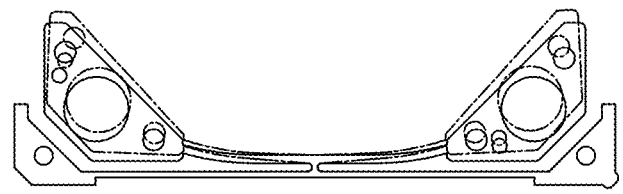
Figure 8:
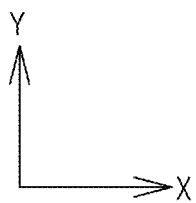

FIGS. 5-8 are plan views of the OIS elastic parts 80. FIGS. 5 and 6 respectively show the flexuosity plans of OIS elastic parts 80 when the permanent magnet mounting base 40 moves slightly toward the positive direction and negative direction of axis X from the default position. FIGS. 7 and 8 respectively show the flexuosity plans of OIS elastic parts 80 when the permanent magnet mounting base 40 moves slightly toward the positive direction and negative direction of axis Y from the default position. The second beam 106 of the second plate spring 101 will be bent by centering on the connection part 96 when the permanent magnet mounting base 40 breaks away from the default position. The bent second beam 106 will restored after the elimination of shaking or the completion of photography as well as the stop of current of the anti-shaking coil 52, and then the permanent magnet mounting base 40 will be carried back to normal position.

Specifically, as show in FIG. 5, when the permanent magnet mounting base 40 moves toward the negative direction of axis X from the given position, the third external end 102 of the second plate spring 101 above the Fig. will move toward the direction far from the third external end of the second plate spring under the Fig. while the fourth external end 104 of the second plate spring 101 above the Fig. will move toward the direction near to the fourth external end of the second plate spring under the Fig. Meanwhile, the third external end of the second plate spring under the Fig. will move toward the direction far from the third external end 102 of the second plate spring 101 above the Fig. while the fourth external of the second plate spring under the Fig. will move toward the direction near to the fourth external 104 of the second plate spring 101 above the Fig.

As show in FIG. 6, when the permanent magnet mounting base 40 moves toward the negative direction of axis X from the given position, the third external end 102 of the second plate spring 101 above the Fig. will move toward the direction near to the third external end of the second plate spring under the Fig. while the fourth external end 104 of the second plate spring 101 above the Fig. will move toward the direction far away the fourth external end of the second plate spring under the Fig. Meanwhile, the third external end of the second plate spring under the Fig. will move toward the direction near to the third external end 102 of the second plate spring 101 above the Fig. while the fourth external of the second plate spring under the Fig. will move toward the direction far from the fourth external 104 of the second plate spring 101 above the Fig.

As show in FIG. 7, when the permanent magnet mounting base 40 moves toward the negative direction of axis Y from the given position, the third external end 102 of the second plate spring 101 above the Fig. will move toward the direction near to the third external end of the second plate spring under the Fig. while the fourth external end 104 of the second plate spring 101 above the Fig. will move toward the direction near to the fourth external end of the second plate spring under the Fig. Meanwhile, the third external end of the second plate spring under the Fig. will move toward the direction far from the third external end 102 of the second plate spring 101 above the Fig. while the fourth external of the second plate spring under the Fig. will move toward the direction far from the fourth external 104 of the second plate spring 101 above the Fig.

As show in FIG. 8, when the permanent magnet mounting base 40 moves toward the positive direction of axis Y from the given position, the third external end 102 of the second plate spring 101 above the Fig. will move toward the direction far from the third external end of the second plate spring under the Fig. while the fourth external end 104 of the second plate spring 101 above the Fig. will move toward the direction far from the fourth external end of the second plate spring under the Fig. Meanwhile, the third external end of the second plate spring under the Fig. will move toward the direction near to the third external end 102 of the second plate spring 101 above the Fig. while the fourth external of the second plate spring under the Fig. will move toward the direction near to the fourth external 104 of the second plate spring 101 above the Fig.

In addition, Hall image sensor is unnecessary to the camera lens module unless the auxiliary measurement of camera position is required.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens driving device, including:
a housing including a base, an upper cover engaged with the base, and a receiving space formed by the base and the upper cover;
a permanent magnet mounting base arranged on the base;
a permanent magnet fixed on the permanent magnet mounting base;
a lens barrel used for holding a lens group therein and movable along a direction parallel to an optic axis of the lens group, the lens barrel being received in the permanent magnet mounting base;
a driving coil surrounding an outer surface of the lens barrel, and opposite to the permanent magnet mounted on the permanent magnet mounting base;
an anti-shake coil opposite to the permanent magnet mounted on the permanent magnet mounting base;
an elastic part suspending and connecting with the lens barrel;
an optic image Stabilizing (OIS) elastic part fixed to an upper surface of the permanent magnet mounting base facing the upper cover and connected to the base for restoring the permanent magnet mounting base to a predetermined position when the permanent magnet mounting base moves along a direction perpendicular to the optic axis;
wherein the OIS elastic part includes at least a pair of plate spring assembly including a first plate spring and a second plate spring connected to the first plate spring, the first plate spring including a first outer end connecting with the base, a second outer end far away from the first outer end and connected with the base, and a first beam connected with the first outer end and the second outer end; and the second plate spring includes a third outer end connecting with the permanent magnet mounting base, a fourth outer end far away from the third outer end and connecting with the permanent magnet mounting base, and a second beam connecting with the third outer end and the fourth outer end; and a connecting part is located between the first beam and the second beam and has two ends connecting to the first beam and the second beam, when the permanent mounting base shifts on the direction perpendicular to the optical axis, the second beam twists about the connecting part and bends along the direction of pulling the permanent magnet mounting base back to the predetermined position.

2. The lens driving device as described in claim 1, wherein the permanent magnet mounting base includes a plurality of pillars and two adjacent pillars form a soleplate for mounting the permanent magnet.

3. The lens driving device as described in claim 2 further including bearing steel balls located between the head cover and the permanent magnet mounting base and passing though the OIS elastic part and the upper elastic part.

4. The lens driving device as described in claim 3, wherein a ball mounting groove for receiving the bearing steel ball is arranged in a surface of the permanent magnet mounting base facing the upper cover, and the upper cover forms a plurality of receiving groove corresponding to the bearing steel ball.

5. The lens driving device as described in claim 4, wherein an inner diameter of the receiving groove is greater than a diameter of the bearing steel ball.

6. The lens driving device as described in claim 1 further including a head cover located between the upper cover and the permanent magnet mounting base, and a gasket arranged between the upper cover and the head cover.

7. The lens driving device as described in claim 1, wherein the elastic part includes an upper elastic part and a lower elastic part, the upper elastic part is fixed and mounted on the surface of the lens barrel facing the upper cover and connected with the surface of the upper cover facing the permanent magnet mounting base, the lower elastic part is fixed and mounted on the surface of the base facing the lower elastic part and connected with the surface of the base facing the permanent magnet mounting base.

8. The lens driving device as described in claim 7, wherein the elastic part includes four flat spring each including a first end, a second end far away from the first end, and a connecting beam connecting the first end to the second end, the first end is connected with the surface of the upper cover facing the permanent magnet mounting base, the second end is connected with the surface of the said upper cover facing the lens barrel.

9. The lens driving device as described in claim 8, wherein the lower elastic part has an annular cantilever and an elastic arm, the elastic arm has a fixed end fixed with the annular cantilever, a free end spaced apart from the fixed end and a connecting arm connecting with the fixed end and the free end, the fixed end is connected with the surface of the base facing the lens barrel, the free end is connected with the surface of the base facing the permanent magnet mounting base.

10. The lens driving device as described in claim 1 further including a lower cover for limiting the lens barrel from moving down along the optical axis and the lower cover is located between the elastic part and the base.

* * * * *